(12) United States Patent
Balaban et al.

(10) Patent No.: US 12,313,905 B1
(45) Date of Patent: May 27, 2025

(54) MONOLITHIC TWO-AXIS FLEXURE WITH CENTER HOLE FEATURE

(71) Applicant: BAE Systems Space & Mission Systems Inc., Broomfield, CO (US)

(72) Inventors: Scott Balaban, Broomfield, CO (US); Miroslaw A Ostaszewski, Louisville, CO (US)

(73) Assignee: BAE Systems Space & Mission Systems Inc., Broomfield, CO (US)

( * ) Notice: Subject to any disclaimer, the term of this patent is extended or adjusted under 35 U.S.C. 154(b) by 581 days.

(21) Appl. No.: 17/723,142

(22) Filed: Apr. 18, 2022

Related U.S. Application Data (60) Provisional application No. 63/319,850, filed on Mar. 15, 2022.

(51) Int. Cl.
| | |
|---|---|
| *F16M 11/00* | (2006.01) |
| *F16C 11/12* | (2006.01) |
| *G02B 7/182* | (2021.01) |
| *G02B 26/10* | (2006.01) |

(52) U.S. Cl.
CPC ............ *G02B 7/1828* (2013.01); *F16C 11/12* (2013.01); *G02B 26/105* (2013.01); *Y10T 403/45* (2015.01); *Y10T 403/54* (2015.01)

(58) Field of Classification Search
CPC ..... G02B 7/1828; G02B 26/105; F16C 11/12; Y10T 403/45; Y10T 403/54
See application file for complete search history.

(56) References Cited

U.S. PATENT DOCUMENTS

| | | |
|---|---|---|
| 854,426 A | 5/1907 | Lowry |
| 1,013,786 A | 1/1912 | Lambert |
| 1,334,557 A | 3/1920 | Ruff |
| | (Continued) | |

FOREIGN PATENT DOCUMENTS

| | | |
|---|---|---|
| DE | 3241373 | 5/1984 |
| EP | 0348845 | 1/1990 |
| | (Continued) | |

OTHER PUBLICATIONS

U.S. Appl. No. 17/397,637, filed Aug. 9, 2021, Ostaszewskil.

(Continued)

*Primary Examiner* — Amy J. Sterling
(74) *Attorney, Agent, or Firm* — Sheridan Ross P.C.

(57) ABSTRACT

Flexure structures, assemblies incorporating flexure structures, and methods utilizing flexure structures to support objects are provided. A flexure structure as disclosed can be formed monolithically from a single piece of material, includes a center aperture to accommodate at least portions of other elements or structures, allows for rotation of a supported object in two axes with very little translational movement of the supported object, provides mounting fixtures on opposite sides of the flexure structure, and has a relatively high load capacity. Flexure structures include base mounts that can each be joined to a first side of an interconnect structure by flexure blades, and object mounts that are each joined to a second side of the interconnect structure by flexure blades. The flexure structure can be a generally annular structure, with the center aperture formed or defined at least in part by the interconnect structure.

20 Claims, 6 Drawing Sheets

(56) References Cited

U.S. PATENT DOCUMENTS

| | | |
|---|---|---|
| 1,602,912 A | 10/1926 | Leipert |
| 1,952,970 A | 3/1934 | Brofelth |
| 2,484,823 A | 10/1949 | Hammond, Jr. |
| 2,990,720 A | 7/1961 | Scholtes |
| 3,060,334 A | 10/1962 | Favre |
| 3,156,759 A | 11/1964 | Collen |
| 3,181,851 A | 5/1965 | Troeger |
| 3,181,918 A | 5/1965 | Troeger |
| 3,188,071 A | 6/1965 | Owen |
| 3,234,844 A | 2/1966 | Fain et al. |
| 3,246,890 A | 4/1966 | Ormond |
| 3,252,696 A | 5/1966 | Friedel |
| 3,453,464 A | 7/1969 | Baker, Jr. |
| 3,465,997 A | 9/1969 | Piske |
| 3,469,418 A | 9/1969 | Stabeler et al. |
| 3,532,408 A | 10/1970 | Dostal |
| 3,592,422 A | 7/1971 | Paine et al. |
| 3,612,643 A | 10/1971 | Weber |
| 3,743,268 A | 7/1973 | Heiland |
| 3,807,029 A | 4/1974 | Troeger |
| 3,811,665 A | 5/1974 | Seelig |
| 3,813,089 A | 5/1974 | Troeger |
| 3,825,992 A | 7/1974 | Troeger |
| 3,909,077 A | 9/1975 | Leonarduzzi |
| 3,952,217 A | 4/1976 | Rawlings |
| 3,981,566 A | 9/1976 | Frank et al. |
| 3,998,092 A | 12/1976 | Maccabee |
| 4,025,203 A | 5/1977 | Lee |
| 4,060,315 A | 11/1977 | Heinz |
| 4,160,177 A | 7/1979 | Ascoli |
| 4,230,291 A | 10/1980 | Marshall, II |
| 4,261,211 A | 4/1981 | Haberland |
| 4,302,709 A | 11/1981 | Tichtinsky |
| 4,306,463 A | 12/1981 | King |
| 4,327,527 A | 5/1982 | Seelig et al. |
| 4,380,108 A | 4/1983 | Craig |
| 4,382,709 A | 5/1983 | Brown |
| 4,439,003 A | 3/1984 | Roth |
| 4,460,252 A | 7/1984 | Volleau et al. |
| 4,497,465 A | 2/1985 | Yeakley et al. |
| 4,507,979 A | 4/1985 | Zebrowski |
| 4,511,115 A | 4/1985 | Ludwigsen |
| 4,533,100 A | 8/1985 | Paseri |
| 4,538,882 A | 9/1985 | Tanaka et al. |
| 4,540,141 A | 9/1985 | Durno et al. |
| 4,613,203 A | 9/1986 | Proetel et al. |
| 4,619,498 A | 10/1986 | Croiset |
| 4,637,596 A | 1/1987 | Lewis |
| 4,655,629 A | 4/1987 | Flaherty |
| 4,678,295 A | 7/1987 | Fisher |
| 4,723,456 A | 2/1988 | Kohler et al. |
| 4,732,440 A | 3/1988 | Gadhok |
| 4,738,500 A | 4/1988 | Grupp et al. |
| 4,770,522 A | 9/1988 | Alten |
| 4,782,475 A | 11/1988 | Chandler |
| 4,802,720 A | 2/1989 | Paulsen |
| 4,802,784 A | 2/1989 | Brooks |
| 4,812,072 A | 3/1989 | Brooks |
| 4,825,713 A | 5/1989 | Wilkey |
| 4,861,125 A | 8/1989 | Vaught |
| 4,902,083 A | 2/1990 | Wells |
| 4,919,382 A | 4/1990 | Forman |
| 4,919,993 A | 4/1990 | Woodruff |
| 4,932,210 A | 6/1990 | Julien et al. |
| 4,973,145 A | 11/1990 | Kirkwood et al. |
| 4,977,791 A | 12/1990 | Erichsen |
| 4,997,123 A | 3/1991 | Backus et al. |
| 5,009,473 A | 4/1991 | Hunter et al. |
| 5,015,831 A | 5/1991 | Eastman et al. |
| 5,066,084 A | 11/1991 | Culp |
| 5,097,356 A | 3/1992 | Paulsen |
| 5,110,195 A | 5/1992 | Loney |
| 5,267,720 A | 12/1993 | Brazell et al. |
| 5,277,076 A | 1/1994 | Ostaszewski |
| 5,283,682 A | 2/1994 | Ostaszewski |
| 5,315,890 A | 5/1994 | Long |
| 5,521,740 A | 5/1996 | Brosens |
| 5,529,277 A | 6/1996 | Ostaszewski |
| 5,620,169 A | 4/1997 | Payne |
| 5,703,732 A | 12/1997 | Boddy et al. |
| 6,198,180 B1 | 3/2001 | Garcia |
| 6,275,624 B1 | 8/2001 | Seddon |
| 6,283,666 B1 | 9/2001 | Genequand |
| 6,300,665 B1 | 10/2001 | Peeters et al. |
| 6,327,065 B1 | 12/2001 | Danial et al. |
| 6,365,252 B1 | 4/2002 | Ortiz et al. |
| 6,428,929 B1 | 8/2002 | Koy et al. |
| 6,625,342 B2 | 9/2003 | Staple et al. |
| 6,661,962 B1 | 12/2003 | Calvet et al. |
| 6,862,122 B1 | 3/2005 | Moore |
| 6,972,885 B2 | 12/2005 | Hiley et al. |
| 7,227,111 B2 | 6/2007 | Eckelkamp-Baker et al. |
| 7,354,170 B2 | 4/2008 | Ishikawa |
| 7,515,385 B1 | 4/2009 | Abrahamson et al. |
| 7,538,959 B1 | 5/2009 | Wheeler |
| 8,556,533 B2 | 10/2013 | Bullard |
| 8,702,337 B2 | 4/2014 | Whitney et al. |
| 8,708,593 B2 | 4/2014 | Stratton |
| 8,724,095 B2 | 5/2014 | Goodwin et al. |
| 9,057,610 B2 | 6/2015 | Graesser et al. |
| 9,212,691 B2 | 12/2015 | Smith |
| 9,354,422 B1 | 5/2016 | Quakenbush |
| 9,612,436 B1 | 4/2017 | Hoffman et al. |
| 9,880,263 B2 | 1/2018 | Droz et al. |
| 9,954,612 B1 | 4/2018 | La Fata |
| 10,139,617 B2 | 11/2018 | Bullard |
| 10,379,372 B2 * | 8/2019 | De Beule ............... G02B 7/14 |
| 10,443,649 B2 | 10/2019 | Balaban et al. |
| 10,591,676 B1 | 3/2020 | Ostaszewski et al. |
| 10,598,924 B2 | 3/2020 | Ostaszewski |
| 10,914,339 B2 | 2/2021 | Warden |
| 11,686,361 B2 * | 6/2023 | Gilmore ............... B60N 2/54 |
| | | 248/560 |
| 2002/0101287 A1 | 8/2002 | Fowler |
| 2002/0176683 A1 | 11/2002 | Harman et al. |
| 2003/0026526 A1 | 2/2003 | Trissel et al. |
| 2003/0160540 A1 | 8/2003 | Miller et al. |
| 2004/0140737 A1 | 7/2004 | Barillot et al. |
| 2005/0173770 A1 | 8/2005 | Linden et al. |
| 2005/0179976 A1 | 8/2005 | Davis et al. |
| 2005/0280879 A1 | 12/2005 | Gibson et al. |
| 2006/0062528 A1 | 3/2006 | Morris et al. |
| 2008/0219705 A1 | 9/2008 | Lee |
| 2009/0245307 A1 | 10/2009 | Iida et al. |
| 2010/0208322 A1 | 8/2010 | Borchers |
| 2012/0236379 A1 | 9/2012 | Da Silva et al. |
| 2014/0208848 A1 | 7/2014 | Krylov et al. |
| 2016/0259252 A1 | 9/2016 | Suzuki et al. |
| 2018/0095223 A1 | 4/2018 | Wiley et al. |
| 2018/0252260 A1 | 9/2018 | Bullard |
| 2018/0252261 A1 | 9/2018 | Bullard |
| 2019/0120287 A1 | 4/2019 | Cosandier et al. |
| 2020/0008827 A1 | 1/2020 | Dearden et al. |
| 2021/0263292 A1 | 8/2021 | Visser et al. |

FOREIGN PATENT DOCUMENTS

| | | |
|---|---|---|
| EP | 1013949 | 6/2000 |
| EP | 1887398 | 2/2008 |
| EP | 3324193 | 5/2018 |
| GB | 939741 | 10/1963 |
| GB | 1454427 | 11/1976 |

OTHER PUBLICATIONS

U.S. Appl. No. 17/675,024, filed Feb. 18, 2022, Renken et al.

Markovic et al. "Characterization of cross-spring pivots for micropositioning applications," Proceedings of SPIE, Smart Sensors, Actuators, and MEMS VII; and Cyber Physical Systems, May 2015, vol. 9517, 951727. 8 pages.

Allegranza et al. "Actuators for Space Applications: State of the Art and New Technologies," Actuator 2014, 14th International Confer- (56) References Cited

OTHER PUBLICATIONS ence on New Actuators, Jun. 23-25, 2014, Bremen, Germany, pp. 283-288, 38 pages.
Awtar et al. "An XYZ Parallel-Kinematic Flexure Mechanism With Geometrically Decoupled Degrees of Freedom," Journal of Mechanisms and Robotics, Feb. 2013, vol. 5, No. 1, 015001, 8 pages.
Letty et al. "Miniature Piezo Mechanisms for Optical and Space Applications," Actuator 2004, 9th International Conference on New Actuators, Jun. 14-16, 2004, Bremen, Germany, pp. 177-180.
Shimizu et al. "Development of Fine Pointing Mechanism for Optical Inter-Satellite Communication," Proceedings of the International Conference on Space Optical Systems and Applications (ICSOS), May 7-9, 2014, Kobe, Japan, 7 pages.
Syms et al. "Scalable electrothermal MEMS actuator for optical fibre alignment," Journal of Micromechanics and Microengineering, 2004, vol. 14, pp. 1633-1639.
Wang et al. "Four-plate piezoelectric actuator driving a large-diameter special optical fiber for nonlinear optical microendoscopy," Optics Express, Aug. 2016, vol. 24, No. 17, pp. 19949-19960.

\* cited by examiner

MONOLITHIC TWO-AXIS FLEXURE WITH CENTER HOLE FEATURE

CROSS-REFERENCE TO RELATED APPLICATIONS

This application claims the benefit of U.S. Provisional Patent Application Ser. No. 63/319,850, filed Mar. 15, 2022, the entire disclosure of which is hereby incorporated herein by reference.

FIELD

The present disclosure provides flexure structures or suspension systems for supporting objects, such as but not limited to mirrors, that are monolithic, allow for rotation about two perpendicular axes while minimizing translational movement, provide a center aperture, and position mounting surfaces on opposite sides of the axes of rotation.

BACKGROUND

It is a problem in the area of suspension systems to provide a flexible support structure having two degrees of freedom of rotation about a desired point while minimizing any translational movement of the object being supported. Optical scanning systems are a typical example of a type of system which requires a flexible suspension system having a high scanning frequency. In scanning systems that use a mirror to rapidly scan back and forth across an angular excursion, suspension component friction must be kept to a minimum in order to permit a high scanning frequency. It is also desirable to provide rotational freedom about two orthogonal axes while minimizing translational movement of the mirror or other supported object.

Suspension systems for supporting steering mirrors have been developed that provide two degrees of rotational freedom. However, many of these systems require that multiple separate components be interconnected to one another to form the complete flexure assembly. For example, such a flexure assembly can include no less than five components: 4 flexures and 1 interconnecting element. The need for multiple components can create tolerance stack up issues, in which the effect of small dimensional errors is amplified to become a significant source of imprecision in the final assembly, resulting in axial misalignment in one or both axes of the assembled two-axis flexure. This potential misalignment can result in an overall degradation in the performance of the system. In addition prior designs for a flexure do not have a center hole, which can create various difficulties, such as making incorporation of the flexure in a larger assembly more difficult. In addition, various flexure assemblies that have been described can be difficult to implement as part of a stacked assembly. Various prior flexure configurations have also lacked adequate angular movements, and have suffered from relatively low load carrying capabilities.

SUMMARY

Embodiments of the present disclosure provide suspension systems, also referred to herein as cross flexure suspension systems or flexure structures, that enable objects to be rotated or oscillated about two perpendicular axes, while restricting translational movement in all other directions. A flexure structure as disclosed herein can be formed as a single, integral or monolithic structure. In addition, at least some embodiments of a flexure structure as disclosed herein provide a central aperture. In accordance with still further embodiments of the present disclosure, base mounting surfaces are provided on a first side of the flexure structure, and object mounting surfaces are provided on a second side of the flexure structure.

In accordance with embodiments of the present disclosure, the flexure structure includes first and second base mounts that each provide a base mounting surface or interface. The flexure structure further includes first and second object mounts that each provide an object mounting surface or interface. An interconnect or intermediate structure is joined to the first and second base mounts by first and second flexure units respectively, and is joined to the first and second object mounts by third and fourth flexure units respectively.

A flexure unit in accordance with embodiments of the present disclosure can be configured as a structure having a plurality of blades that extend radially from a center line that is coincident with an axis of rotation of the flexure structure. The first and second flexure units are disposed along a first axis of rotation of the flexure structure, while the third and fourth flexure units are disposed along a second axis of rotation of the flexure structure. In accordance with at least some embodiments of the present disclosure, the first and second axes are perpendicular to one another, and are disposed within a common plane.

As an example, a flexure structure as disclosed herein can be used to support a moveable optical element, such as a steering mirror. The flexure structure permits motion of the mirror about either or both axes, with restricted or limited translational movement of the mirror. Motion of the mirror relatively to the base can be initiated by motors or actuators. The aperture provided in the center of the interconnect structure by embodiments of the present disclosure can be used to accommodate various items, such as but not limited to electrical signal or power lines, optical signals, fluid conduits, or other components, such as position sensors, motors, circuit elements, or the like.

Methods of providing a flexure structure in accordance with embodiments of the present disclosure include forming a two axis degree of freedom (DOF) cross flexure suspension system or flexure structure from a single piece of material. The flexure structure can be provided as a suspension system that is used as a steering mirror suspension that allows relatively large angular tip-tilt motions while constraining all other degrees of freedom. The flexure structure can be provided as a monolithic structure. In accordance with at least some embodiments of the present disclosure, a flexure structure as disclosed herein can be manufactured using an electrical discharge machining (EDM) process, allowing the formation of thin flexure unit blades and other precisely located, integral elements, while eliminating the need for welded, brazed, or bolted joints.

In accordance embodiments of the present disclosure, the flexure structure is a monolithic structure providing base mounts on a first side of the flexure structure that are joined to an interconnect or intermediate structure by first and second flexure units having first and second sets of flexure blades respectively, and object mounts on a second side of the flexure structure that are joined to the interconnect by third and fourth flexure units having third and fourth sets of flexure blades respectively. The first and second sets of flexure blades can be centered on a first axis of rotation of the flexure structure, while the third and fourth sets of flexure blades can be centered on a second axis of rotation of the flexure structure. The first and second axes of rotation can be orthogonal to one another. In at least some embodiments, each set of flexure blades includes at least four blades extending from a line that is centered on one of the axes of rotation. In accordance with further embodiments, each set of flexure blades includes at least six blades. The angular spacing of the blades about the axis of rotation can be equal or asymmetrical.

Additional features and advantages of embodiments of the present disclosure will become more readily apparent from the following description, particularly when taken together with the accompanying drawings.

DETAILED DESCRIPTION

Figure 1A:
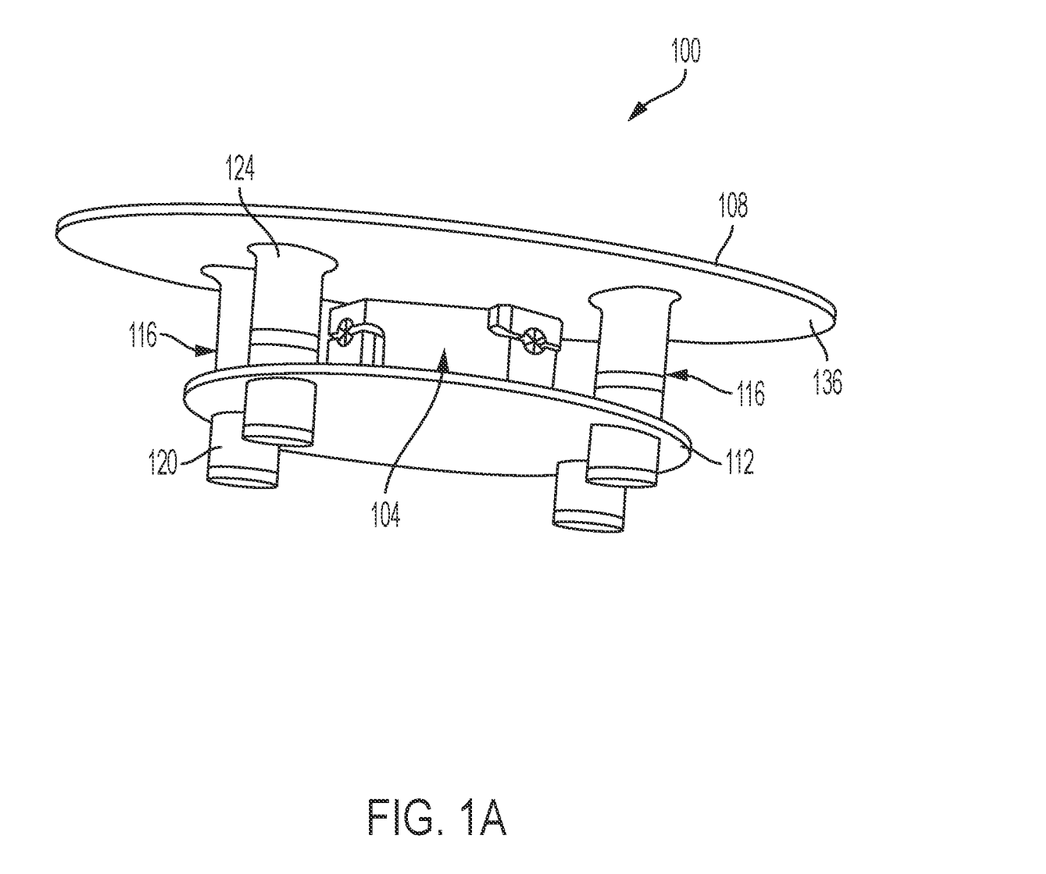
FIG. 1A is a perspective view of a steering mirror assembly incorporating a flexure structure in accordance with embodiments of the present disclosure.
Figure 1B:
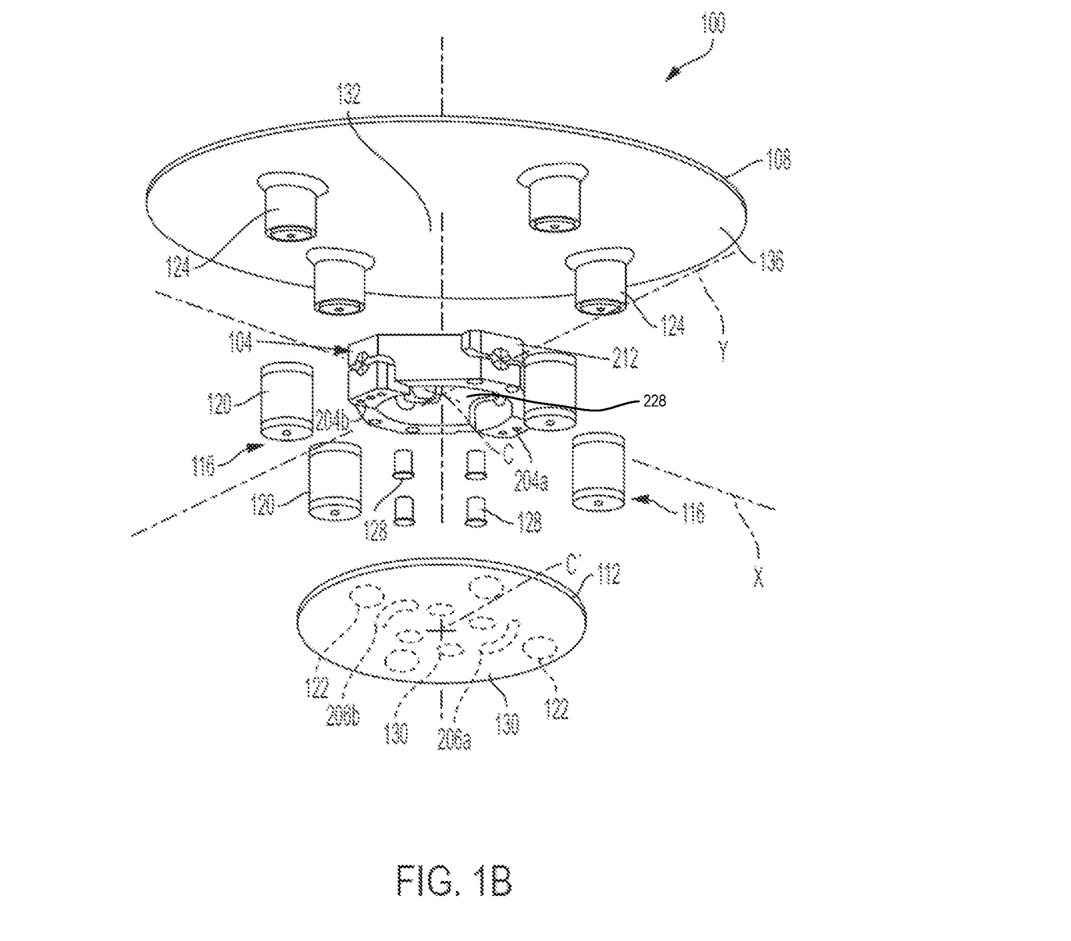
FIG. 1B is an exploded perspective view of the steering mirror assembly of FIG. 1A.
Figure 2:
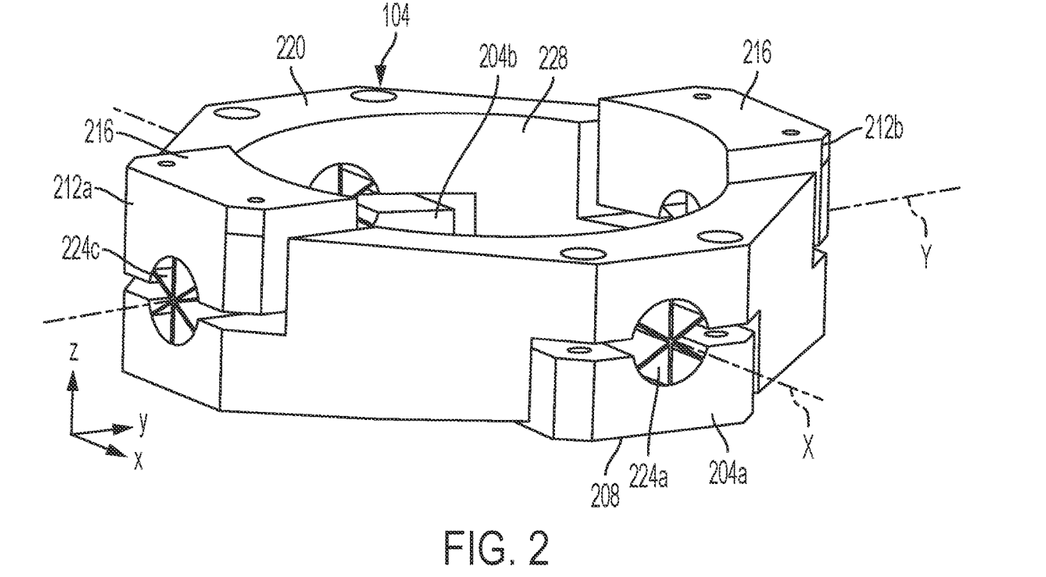
FIG. 2 is a perspective view of a flexure structure in accordance with embodiments of the present disclosure.
Figure 3:
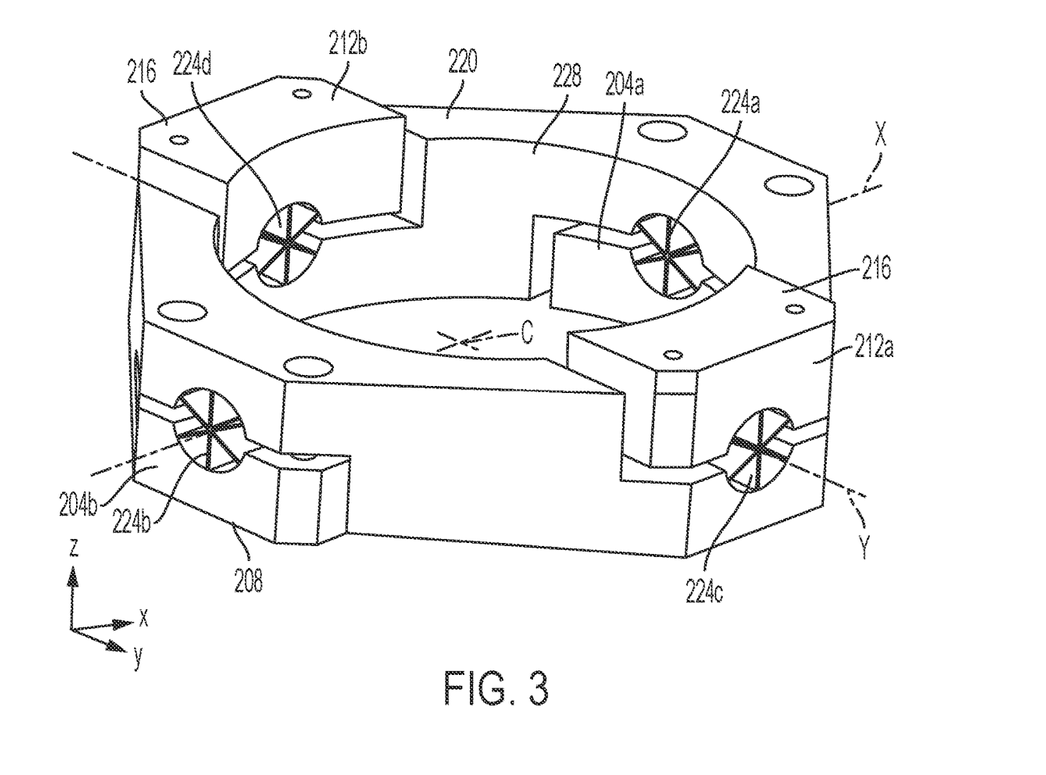
FIG. 3 is another perspective view of the flexure structure of FIG. 2 in accordance with embodiments of the present disclosure.
Figure 4:
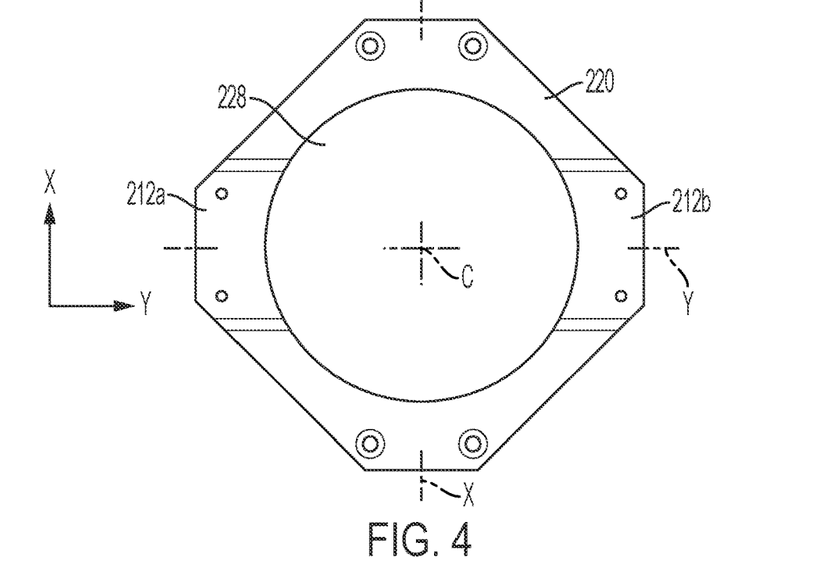
FIG. 4 is a top plan view of the flexure structure of FIG. 2 in accordance with embodiments of the present disclosure.
Figure 5:
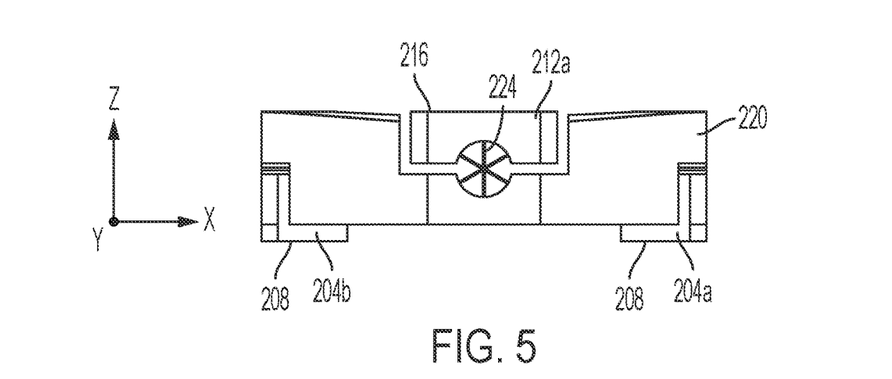
FIG. 5 is a side elevation view of the flexure structure of FIG. 2 in accordance with embodiments of the present disclosure.
Figure 6:
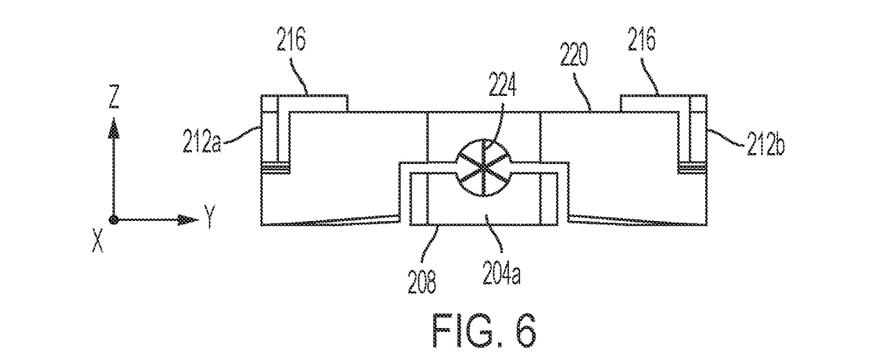
FIG. 6 is another side elevation view of the flexure structure of FIG. 2 in accordance with embodiments of the present disclosure.

With reference now to FIG. 1A, components of an assembly 100 that includes a cross flexure suspension system or flexure structure 104 in accordance with embodiments of the present disclosure is depicted in a perspective view. FIG. 1B depicts the assembly 100 of FIG. 1A in an exploded perspective view. In general, the flexure structure 104 joins or interconnects a supported object 108 to a base or base assembly 112. In the illustrated example, the assembly 100 is a steering mirror assembly and the supported object 108 is a mirror. However, the supported object 108 is not limited to any particular object or assembly. In accordance with at least some embodiments of the present disclosure, the flexure structure 104 permits movement of the supported object 108 relative to the base 112 about two rotational axes, X and Y, while eliminating or minimizing translational movement of the supported object 108 relative to the base 112, and while eliminating or minimizing rotation of the supported object 108 about the Z axis. Accordingly, the assembly 100 enables tip-tilt movements of the supported object 108 to be performed relative to the base 112.

The flexure structure 104 behaves like a spring, and thus returns the supported object 108 to a center or neutral position in the absence of the application of a force. In addition, the flexure structure 104 can allow for relatively large angles of travel about the two rotational axes X and Y, while providing low suspension component friction to permit a high scanning frequency, and a relatively fixed point of rotation to minimize or limit translational movement of the supported object 108. As an example, the angles of travel about each rotational axis can be +/−10°. In addition, the flexure structure 104 can be formed as a monolithic structure, to reduce or eliminate points of failure and alignment error. The flexure structure 104 can also be produced as a relatively small structure.

Movement of the supported object 108 relative to the base 112 can be accomplished by incorporating actuators or motors 116 as part of the assembly 100. In accordance with embodiments of the present disclosure, the actuators 116 can be in the form of voice coil motors that each include a coil 120 and a magnet 124. The assembly 100 can additionally include position sensors 128. The position sensors 128 can comprise eddy current sensors, encoders, differential impedance transducer type proximity sensors or optical sensors which operate in pairs to sense the angular position of the supported object 108. In the illustrated example, a set of position sensors 128 are provided that operate in pairs to sense a rotation of the supported object 108 about the X and Y axes are shown. More particularly, in the illustrated example, the position sensors 128 operate by sensing a relative proximity of a reference surface 132 of a supported object support or carrier structure 136.

As shown in FIG. 1B, the flexure structure 104 includes a first base mount 204a and a second base mount 204b that are interconnected to the base at mounting points 206a and 206b respectively. The coil 120 portions of the motors 116 are mounted to the base at motor mounting points 122. The position sensors 128 are mounted to the base 112 at sensor mounting points 130. In accordance with embodiments of the present disclosure, the position sensors 128 can at least partially occupy a central aperture 228 in the flexure structure 104. The flexure structure 104 also includes object mounts 212 (only one of which is visible in FIG. 1B) that are interconnected to the underside of the supported object carrier structure 136.

With reference now to FIGS. 2-6, the flexure structure 104 includes a first base mount 204a and a second base mount 204b that are interconnected to one another, to a first object mount 212a, and a second object mount 212b by an intermediate or interconnect structure 220. In accordance with embodiments of the present disclosure, the flexure structure 104 features a central aperture 228. Therefore, in accordance with embodiments of the present disclosure, the interconnect structure 220 can be configured as a generally annular structure that defines a central hole or aperture 228. The central aperture 228 can be any shape, including but not limited to circular, square, pentagonal, or octagonal. Moreover, the central aperture 228 can be disposed symmetrically or asymmetrically about a center point C, defined as the intersection of the X and Y axes of rotation of the flexure structure 104.

Each of the base mounts 204 can include a corresponding base mounting surface or interface 208 that is disposed on a first side (e.g. a base or bottom side) of a plane containing or parallel to the X and Y axes of the flexure structure 104. Each of the object mounts 212 can include a corresponding object mounting surface or interface 216 that is disposed on a second side (e.g. a supported object or top side) of the plane containing the X and Y axes of the flexure structure 104. As shown in the example configuration, the first base mount 204a and the second base mount 204b are located along the X axis and on opposite sides of a center point C of the central aperture 228 from one another. In addition, the first object mount 212a and the second object mount 212b are located along the Y axis and on opposite sides of the center point C of the central aperture 228 from one another. One or both of the base mounting surfaces 208 can be located within a first plane that is parallel to the plane containing the X and Y axes of the flexure structure 104. Similarly, one or both of the object mounting surfaces 212 can be located within a second plane that is parallel to the plane containing the X and Y axes of the flexure structure 104. Alternatively or in addition, the base mounting surfaces 208 can be centered along the X axis, and/or the object mounting surfaces 216 can be centered along the Y axis.

Each of the base mounts 204 and each of the object mounts 212 is connected to the intermediate or interconnect structure 220 by a corresponding flexure unit 224. As depicted in FIGS. 2, 3, 5, 6, and 7, each of the flexure units 224 includes a plurality of blades 232 that extend from a center line 236 (see FIG. 7) that corresponds to one of the axes of rotation X or Y or the flexure structure 104. Moreover, each flexure unit is configured to allow the connected mount 204 or 212 to rotate relative to the corresponding one of the axes of rotation X or Y of the flexure structure 104. More particularly, one half of the blades 232 within any one of the flexure units 224 extend between a center line 236 that is coincident with one of the axes of rotation of the flexure structure 104 and the interconnect structure 220, and the other half of the blades 232 extend between the center line 236 and the mount 204 or 212 with which the particular flexure unit 224 is associated. In particular, in the illustrated example, the first 224a and second 224b flexure units are centered on the X axis, connect the first 204a and second 204b base mounts respectively to the interconnect structure 220, and allow a rotation of the base mounts 204 about the X axis. Similarly, the third 224c and fourth 224d flexures are centered on the Y axis, connect the first 212a and second 212b object mounts respectively to the interconnect structure 220, and allow a rotation of the object mounts 212 about the Y axis.

Figure 7:
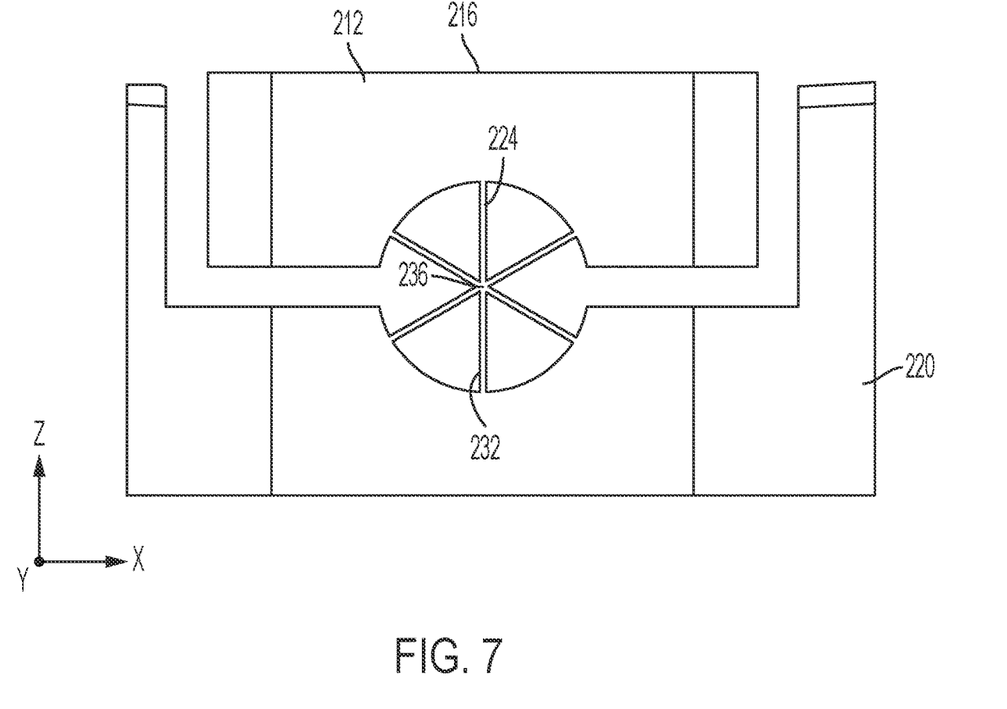
FIG. 7 is a side elevation view of a flexure unit of a flexure structure in accordance with embodiments of the present disclosure.

The blades 232 within a flexure unit 224 have a length that is measured from the center line 236 to the interface of the blades 232 with the associated mount 204 or 212 or to the interface of the blades with the interconnect structure 220, a width that extends in a direction parallel to the centerline 236, and a thickness that extends in a direction perpendicular to the centerline 236. In accordance with embodiments of the present disclosure, the blades 232 within any one flexure unit 224 all have the same dimensions. Moreover, the dimensions of the blades 232 included in the flexure units 224 disposed along a common axis all have the same dimensions. Accordingly, lines along surfaces of the mounts 204 or 212 and the interconnect structure 220 at which blades 232 interface with the mounts 204 or 212 or the interconnect structure 220 can be equidistant from the respective axis of rotation, and can have the same length. In accordance with still further embodiments of the present disclosure, the blades 232 of all of the flexure units 224 within the flexure structure 104 can have the same dimensions. Although depicted as rectangular, a blade 232 can be tapered along any or all of its edges or surfaces. As can be appreciated by one of skill in the art after consideration of the present disclosure, in addition to the dimensions of the flexure blades 232, the stiffness and load capacity of the flexure units 224 are functions of the number of blades 232 within the flexure units 224. In accordance with embodiments of the present disclosure, each flexure 224 includes at least four blades 232. Moreover, each flexure 224 includes an even number of blades 232, with half of the blades extending from the center point to the supported mount 204 or 212, and half of the blades extending from the center point to the interconnect structure 220. Although the flexure units 224 shown in the figures have blades 232 that are spaced apart from one another by equal angular amounts, any relative radial spacing is possible.

In accordance with embodiments of the present disclosure, the central aperture 228 is a volume defined by surfaces of the mounts 204 and 212, the intermediate structure 220, and the flexure units 224 that face a central line extending perpendicular to a plane defined by the X and Y axes, and that passes through the center point C at the intersection of the X and Y axes. As can be appreciated by one of skill in the art after consideration of the present disclosure, the central aperture 228 can accommodate various components of a system or instrument incorporating the flexure structure 104. For example, as depicted in FIG. 1, a volume within the central aperture 228 can contain all or portions of a supported object 108 system, such as but not limited to a plurality of position sensors 128 and a surface 120 of a supported object support structure 124. Alternatively or in addition, the central aperture 228 can accommodate electrical signal or power lines, optical signal paths, fluid conduits, structural components, etc. The interconnect structure 220 extends adjacent a side of the base mounts 204 opposite the side on which the base mounting surfaces 208 are formed, and adjacent a side of the object mounts 212 opposite the side on which the object mounting surfaces 216 are formed.

Figure 8:
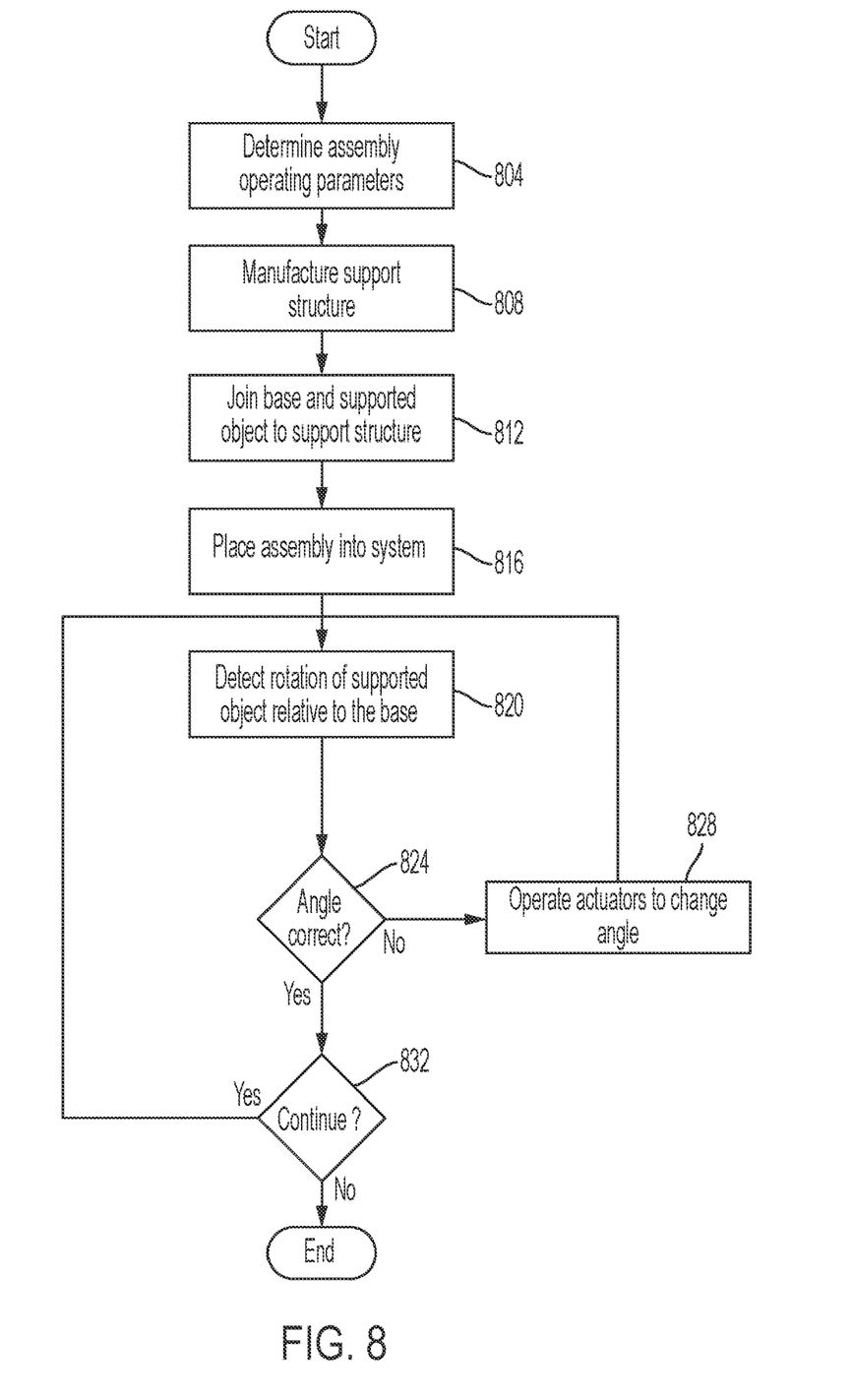
FIG. 8 is a flowchart depicting aspects of a method for providing a system incorporating a flexure structure in accordance with embodiments of the present disclosure.

With reference now to FIG. 8, aspects of a method for providing an assembly 100 incorporating a flexure structure 104 that supports an object 108 and that provides for movement of the supported object 108 about two axes of rotation relative to a base 112, and that further provides a central aperture 228, are depicted. Initially, operating parameters of the assembly 100, including but not limited to a mass of the supported object 112 and a maximum angle of deflection of the supported object 108 about each of the axes are determined (step 804). As can be appreciated by one of skill in the art after consideration of the present disclosure, such parameters can be used to at least in part determine the dimensions and other specifications of the support structure 104, including the number of blades 232 included in each flexure unit 124, the dimensions of the blades 232, and the material from which the flexure structure 104 is formed.

Once the dimensions and other specifications of the support structure 104 are determined, the support structure 104 can be manufactured or formed (step 808). The support structure 104 generally includes a pair of base mounts 204 interconnected to an intermediate structure 220 by a pair of flexure units 224 that are centered on a first axis, and a pair of object mounts 212 that are interconnected to the intermediate structure 220 by another pair of flexure units 224, as discussed elsewhere herein. In accordance with at least some embodiments of the present disclosure, the support structure 104 is formed as an integral, single monolithic structure. For example, the support structure 104 can be formed from a single, unitary piece of material using a subtractive process, such as machining, electrical discharge machining, or the like. As another example, the support structure 104 can be formed as an integral, single monolithic structure using an additive process, such as a three-dimensional printing process. Example materials can include aluminum, titanium, steel, or other metals or metal alloys, plastics, composites, or the like. Where the support structure 104 is formed as a monolithic element, dimensional errors that may result from interconnecting multiple separate components are avoided. In addition, the structural integrity of the structure can be increased as compared to suspension systems formed as assemblies of separate components.

The base 112 can then be joined to the base mounts 204 on a first side of the flexure structure 104, and the supported object 108 can be joined to the object mounts 212 on a second side of the flexure structure (step 812). Joining the base 112 and the supported object 108 to the mounts 204 and 212 can include fixing the base 112 and the supported object 108 to the respective mounts 204 and 212 using mechanical fasteners. In accordance with embodiments of the present disclosure, joining the components 104, 108, and 112 can also include positioning portions of at least one of the supported object 108 or base 112, or components mounted to one of the supported object 108 or base 112, at least partially within a central aperture 228 defined by the flexure structure 104. Alternatively or in addition, other components or features, such as signal lines or signal paths, can be placed or formed within the central aperture 228.

The assembly 100 can then be disposed within a larger system (step 816). For example, where the assembly 100 is a steering mirror assembly, it can be fixed to an optical bench or other structure included within an optical system or device, such as an optical switch, a light detecting and ranging device, an optical communication system, or the like.

After the assembly 100 has been incorporated into a system, it can be operated. Operation of the assembly 100 can include detecting a current rotation or position of the supported object 108 relative to the base 112 using position sensors 128 (step 820), and determining whether a different angle is required for a current or next operation (step 824). As can be appreciated by one of skill in the art after consideration of the present disclosure, determining a current rotation can include determining a current rate of rotation, for example in connection with an assembly 100 that performs a scanning function. If a different angle or rate of rotation is required, actuators 124 can be operated to change the angle or rate (step 828). The rotation of the supported object 108 can then again be checked (step 820). After it is determined at step 824 that the angle is correct for a given operating state, a determination can next be made as to whether operation of the assembly 100 is to continue (step 832). If operation is to continue, the process can return to step 820. Otherwise, the process can end.

In accordance with embodiments of the present disclosure, the various components of the flexure structure 104, including the base mounts 204, the interconnect structure 220, the object mounts 212, and the flexure units 224, are all formed from a single piece of material. As an example, but without limitation, the material can be a metal, such as aluminum, steel, or titanium, plastic, or a composite. In accordance with further embodiments of the present disclosure, the flexure structure 104 can be formed using a subtractive manufacturing process, such as an electrical discharge machining (EDM) process, or an additive manufacturing process, such as a 3D printing process. This monolithic or integral formation of the suspension structure 104 is advantageous in that it avoids or reduces the need to weld, braze, bond, attach or otherwise connect individual pieces at such joints. This can in turn provide a suspension structure 104 that is more robust, can operate reliably over a larger number of cycles, and/or can be produced with greater precision than flexure structures manufactured from separate components.

Although various examples of a flexure structure 104 used in combination with a supported object 108, such as a steering mirror, have been described, embodiments of the present disclosure are not so limited. For example, a flexure structure 104 in accordance with embodiments of the present disclosure can be used as a support for any object, structure or component in which it is desirable to provide two degrees of freedom of movement about (or nearly about) a fixed point between a base structure 112 and a supported object or assembly 108. Moreover, a flexure structure 104 in accordance with embodiments of the present disclosure can be used in applications where a relatively high frequency of oscillation or change in angle is required or desirable. The flexure structure 104 can also provide a self-centering force, that tends to bring the supported object 108 back to a neutral position relative to the base 112.

Embodiments of the present disclosure provide a flexure structure 104 that allows larger angular travel (more than +/−10 deg.) than previous systems, with minimum pivot point translation or decenter, enabling a robust implementation of a motion control system. In addition, embodiments of the present disclosure allow handling of higher dynamic loads than previous designs. The flexure structure 104 disclosed herein can be more compact than prior systems, allowing implementation in smaller devices. The provision of a central aperture facilitates the inclusion of various components, supply lines, or other elements. In accordance with at least some embodiments, the monolithic flexure is made by an electrical discharge machining (EDM) process, allowing manufacturing of thin flexure blades, and eliminating the need for welded or brazed joints.

Advantages of embodiments of flexure structures in accordance with embodiments of the present disclosure compared to alternative designs include: 1) enables angular displacements about two axes through a high tolerance, monolithic structure; 2) provides a large central hole, providing greater system design flexibility; 3) positions base and supported object mounting interfaces on opposite sides of the flexure structure; and 4) utilizes flexure units having relatively high stiffness.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A structure for supporting an object, comprising:
 a first base mount having a first base mounting interface;
 a second base mount having a second base mounting interface;
 a first object mount having a first supported object mounting interface;
 a second object mount having a second supported object mounting interface;
 a generally annular interconnect structure, wherein the generally annular interconnect structure defines an aperture;
 a first flexure unit, wherein the first flexure unit joins the first base mount to the generally annular interconnect structure;

a second flexure unit, wherein the second flexure unit joins the second base mount to the generally annular interconnect structure;

a third flexure unit, wherein the third flexure unit joins the first object mount to the generally annular interconnect structure; and a fourth flexure unit, wherein the fourth flexure unit joins the second object mount to the generally annular interconnect structure, wherein the first and second flexure units are centered on a first axis, wherein the third and fourth flexure units are centered on a second axis, wherein the first and second base mounting interfaces are on a first side of a plane parallel to the first and second axes, and wherein the first and second supported object mounting interfaces are on a second side of the plane parallel to the first and second axes.

2. The structure of claim 1, wherein the first and second axes are in a common plane.

3. The structure of claim 2, wherein the first and second axes are perpendicular to one another.

4. The structure of claim 3, wherein the first and second flexure units are on opposite sides of the aperture from one another, and wherein the third and fourth flexure units are on opposite sides of the aperture from one another.

5. The structure of claim 4, wherein the first base mount is adjacent to the first flexure unit, and wherein the second base mount is adjacent to the second flexure unit.

6. The structure of claim 5, wherein the first object mount is adjacent to the third flexure unit, and wherein the second object mount is adjacent to the fourth flexure unit.

7. The structure of claim 6, wherein the first and second flexure units each include a plurality of blades that extend from a center line that is coincident with the first axis, and wherein the third and fourth flexure units each include a plurality of blades that extend from a center line that is coincident with the second axis.

8. The structure of claim 1, wherein the generally annular interconnect structure is formed from a single piece of material.

9. The structure of claim 1, wherein the structure is a single integral structure.

10. An assembly, comprising:
a base;
a supported object; and
a flexure structure, wherein the flexure structure interconnects the supported object to the base, and wherein the flexure structure includes:
a generally annular interconnect structure, wherein a central aperture of the generally annular interconnect structure encompasses a center point;
first and second base mounts, wherein the first and second base mounts are joined to the generally annular interconnect structure by first and second flexure units respectively, wherein the first and second base mounts are fixed to the base, and wherein the first and second flexure units are centered along a first axis; and first and second object mounts, wherein the first and second object mounts are joined to the generally annular interconnect structure by third and fourth flexure units respectively, wherein the first and second object mounts are fixed to the supported object, and wherein the third and fourth flexure units are centered along a second axis.

11. The assembly of claim 10, wherein the first and second axes lie in a same plane.

12. The assembly of claim 11, wherein the first and second base mounts are on a first side of the plane, and wherein the first and second object mounts are on a second side of the plane.

13. The assembly of claim 12, wherein the first and second axes are perpendicular to one another.

14. The assembly of claim 10, wherein the supported object is a mirror.

15. The assembly of claim 14, wherein the first and second flexure units permit a tilt motion of the mirror relative to the base and about the first axis, and wherein the third and fourth flexure units permit a tilt motion of the mirror relative to the base about the second axis.

16. The assembly of claim 10, further comprising:
a plurality of position sensors, wherein the position sensors include components that are mounted to the base.

17. The assembly of claim 16, wherein the position sensors are eddy current sensors.

18. The assembly of claim 16, wherein the position sensors are at least partially disposed within the central aperture.

19. The assembly of claim 10, wherein the generally annular interconnect structure is formed from a single piece of material.

20. A method for supporting an object, comprising:
forming a flexure structure from a single, integral piece of material, the flexure structure including:
a generally annular interconnect structure, wherein a central aperture of the generally annular interconnect structure encompasses a center point;
first, second, third, and fourth flexure units;
first and second base mounts, wherein the first and second base mounts are joined to the generally annular interconnect structure by the first and second flexure units respectively, and wherein the first and second flexure units are centered along a first axis;
first and second object mounts, wherein the first and second object mounts are joined to the generally annular interconnect structure by third and fourth flexure units respectively, and wherein the third and fourth flexure units are centered along a second axis;
fixing the first and second base mounts to a base;
fixing the first and second object mounts to a supported object, wherein the first and second flexure units allow a movement of the supported object relative to the base about the first axis, and wherein the third and fourth flexure units allow a movement of the supported object relative to the base about the second axis; and
disposing a component of at least one of the base or the supported object at least partially within the central aperture.

* * * * *